(12) United States Patent
Lin (10) Patent No.: US 10,360,414 B2
(45) Date of Patent: Jul. 23, 2019

(54) ANTI-TAMPER SYSTEM AND AN ANTI-TAMPER CIRCUIT OF THE SAME

(71) Applicant: MITAC COMPUTING TECHNOLOGY CORPORATION, Taoyuan (TW)

(72) Inventor: Ming-Hsiung Lin, Taoyuan (TW)

(73) Assignee: MITAC COMPUTING TECHNOLOGY CORPORATION, Taoyuan (TW)

( * ) Notice: Subject to any disclaimer, the term of this patent is extended or adjusted under 35 U.S.C. 154(b) by 134 days.

(21) Appl. No.: 15/453,605

(22) Filed: Mar. 8, 2017

(65) Prior Publication Data

US 2017/0262661 A1 Sep. 14, 2017

(30) Foreign Application Priority Data

Mar. 14, 2016 (TW) .............................. 105107743 A (51) Int. Cl.
    *G06F 21/86* (2013.01)
    *G06F 21/78* (2013.01)
    *G06F 21/87* (2013.01)

(52) U.S. Cl.
    CPC .............. *G06F 21/86* (2013.01); *G06F 21/78* (2013.01); *G06F 21/87* (2013.01); *G06F 2221/2143* (2013.01)

(58) Field of Classification Search
    CPC .... G06F 21/86; G06F 21/78; G06F 2221/214; G06F 21/87; G06F 1/1626; H05K 1/0213; H05K 1/0263; H05K 1/0275; H01L 24/24; H01L 25/0657

USPC ......... 726/34; 361/748; 327/509; 340/568.1; 257/686, 714
See application file for complete search history.

(56) References Cited

U.S. PATENT DOCUMENTS

| | | | |
|---|---|---|---|
| 9,275,543 B2* | 3/2016 | Oswalt | G08C 19/16 |
| 2003/0137416 A1* | 7/2003 | Fu | G06F 21/86 |
| | | | 340/568.1 |
| 2008/0278217 A1* | 11/2008 | Hankhofer | H05K 1/0275 |
| | | | 327/509 |
| 2010/0258929 A1* | 10/2010 | Kim | H01L 24/24 |
| | | | 257/686 |
| 2013/0001792 A1* | 1/2013 | Uno | H01L 23/49524 |
| | | | 257/773 |
| 2014/0041060 A1* | 2/2014 | Selwood | G06F 21/86 |
| | | | 726/34 |
| 2015/0128297 A1* | 5/2015 | Mirkazemi-Moud | |
| | | | G06F 1/1626 |
| | | | 726/34 |

(Continued)

*Primary Examiner* — Brandon S Hoffman
*Assistant Examiner* — Ali H. Cheema
(74) *Attorney, Agent, or Firm* — Brinks Gilson & Lione (57) ABSTRACT

An anti-tamper system includes a first object, second objects, and an anti-tamper circuit that includes conductive networks and a control unit. Each conductive network includes: conductive modules, each of which is sandwiched between the first object and a corresponding second object; and conductive connection members which are coupled to the conductive modules in such away that at least the conductive modules and the conductive connection members cooperatively form a corresponding electrical path sequentially going through the second objects. The control unit detects damage of each electrical path, and initiates a predetermined action upon detecting the damage.

13 Claims, 4 Drawing Sheets

(56) References Cited

U.S. PATENT DOCUMENTS

| | | | |
|---|---|---|---|
| 2016/0055355 A1* | 2/2016 | Huang | G06F 21/87 |
| | | | 726/34 |
| 2016/0056089 A1* | 2/2016 | Taniguchi | H01L 25/0657 |
| | | | 257/714 |
| 2016/0057856 A1* | 2/2016 | Woodford | H05K 1/0213 |
| | | | 361/748 |
| 2017/0006721 A1* | 1/2017 | Soyano | H05K 1/0263 |

* cited by examiner

ANTI-TAMPER SYSTEM AND AN ANTI-TAMPER CIRCUIT OF THE SAME

CROSS-REFERENCE TO RELATED APPLICATION

This application claims priority of Taiwanese Patent Application No. 105107743, filed on Mar. 14, 2016.

FIELD

The disclosure relates to anti-tamper techniques, and more particularly to an anti-tamper system and an anti-tamper circuit of the same.

BACKGROUND

A conventional anti-tamper circuit is used in an electronic system (e.g., a credit card machine or an automated teller machine) to prevent sensitive data (e.g., personal data or passwords) stored in the electronic system from being easily retrieved by an attacker. However, the conventional anti-tamper circuit may be relatively easy to be cracked by the attacker, and, as a result, the expected effect thereof cannot be achieved.

SUMMARY

Therefore, an object of the disclosure is to provide an anti-tamper system that can alleviate the drawback of the prior art, and an anti-tamper circuit of the same.

According to one aspect of the disclosure, the anti-tamper system includes a first object, a plurality of second objects and an anti-tamper circuit. The anti-tamper circuit includes a plurality of conductive networks and a control unit. Each of the conductive networks includes a first terminal, a second terminal, a plurality of conductive modules and a plurality of conductive connection members. Each of the conductive modules corresponds to one of the second objects, and is sandwiched between the first object and a corresponding one of the second objects. The conductive connection members are electrically coupled to the first and second terminals and the conductive modules in such a way that at least the conductive modules and the conductive connection members cooperatively form a corresponding electrical path between the first and second terminals. The conductive modules are electrically coupled in series. The electrical path sequentially goes through the second objects. For each of the conductive networks, the control unit is electrically coupled to the first and second terminals, detects damage of the electrical path, and initiates a predetermined action upon detecting the damage.

According to another aspect of the disclosure, the anti-tamper circuit is operatively associated with a first object and a plurality of second objects. The anti-tamper circuit includes a plurality of conductive networks and a control unit. Each of the conductive networks includes a first terminal, a second terminal, a plurality of conductive modules and a plurality of conductive connection members. Each of the conductive modules corresponds to one of the second objects, and is used to be sandwiched between the first object and a corresponding one of the second objects. The conductive connection members are electrically coupled to the first and second terminals and the conductive modules in such a way that at least the conductive modules and the conductive connection members cooperatively form a corresponding electrical path between the first and second terminals. The conductive modules are electrically coupled in series. The electrical path sequentially goes through the second objects. For each of the conductive networks, the control unit is electrically coupled to the first and second terminals, detects damage of the electrical path, and initiates a predetermined action upon detecting the damage.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Moreover, it should be noted that throughout the disclosure, when two elements are described as being "coupled in series," "connected in series" or the like, it is merely intended to portray a serial connection between the two elements without necessarily implying that the currents flowing through the two elements are identical to each other and without limiting whether or not an additional element is coupled to a common node between the two elements. Essentially, "a series connection of elements," "a series coupling of elements" or the like as used throughout the disclosure should be interpreted as being such when looking at those elements alone.

Figure 1:
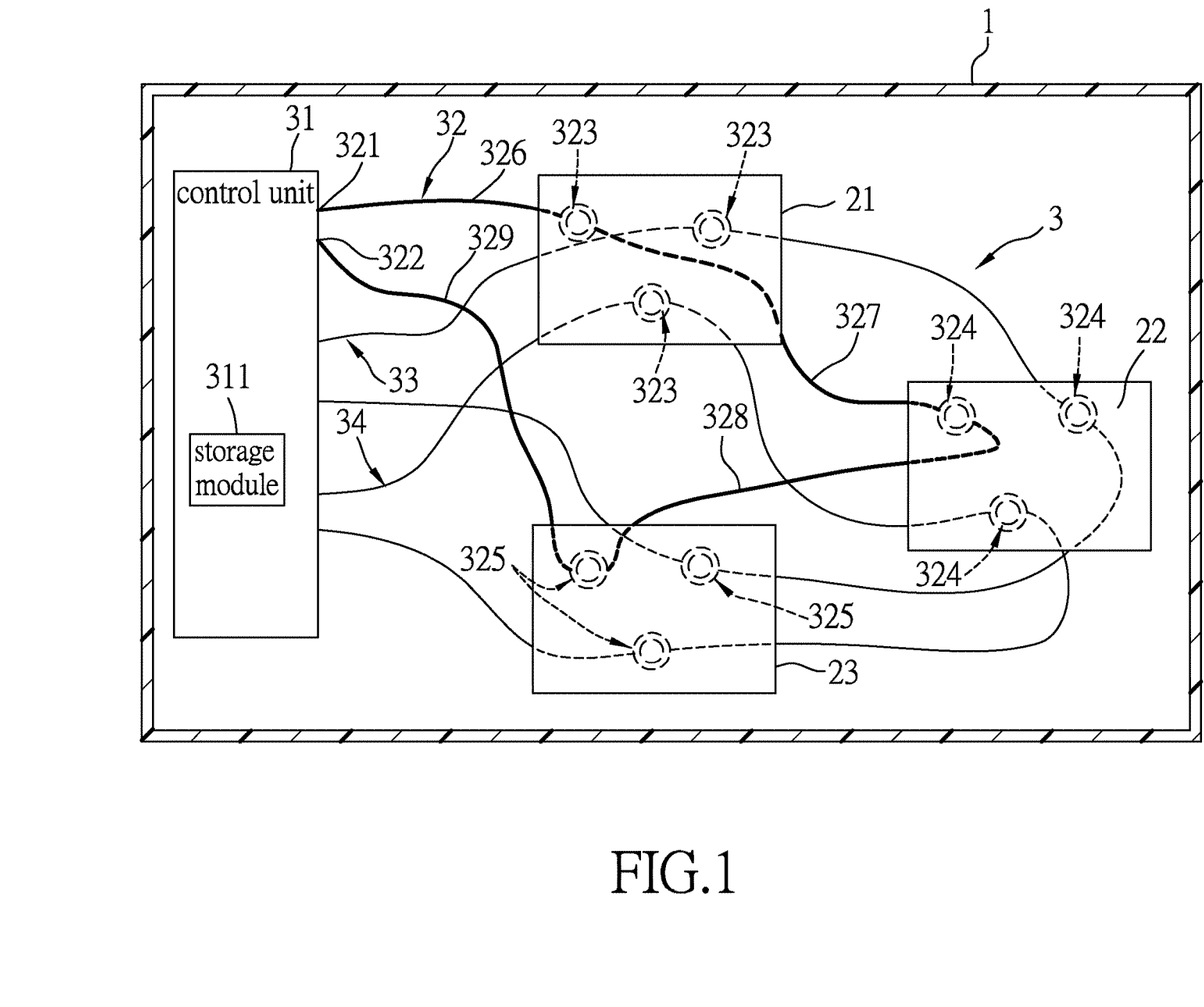
FIG. 1 is a schematic diagram illustrating a first embodiment of an anti-tamper system according to the disclosure.
Figure 2:
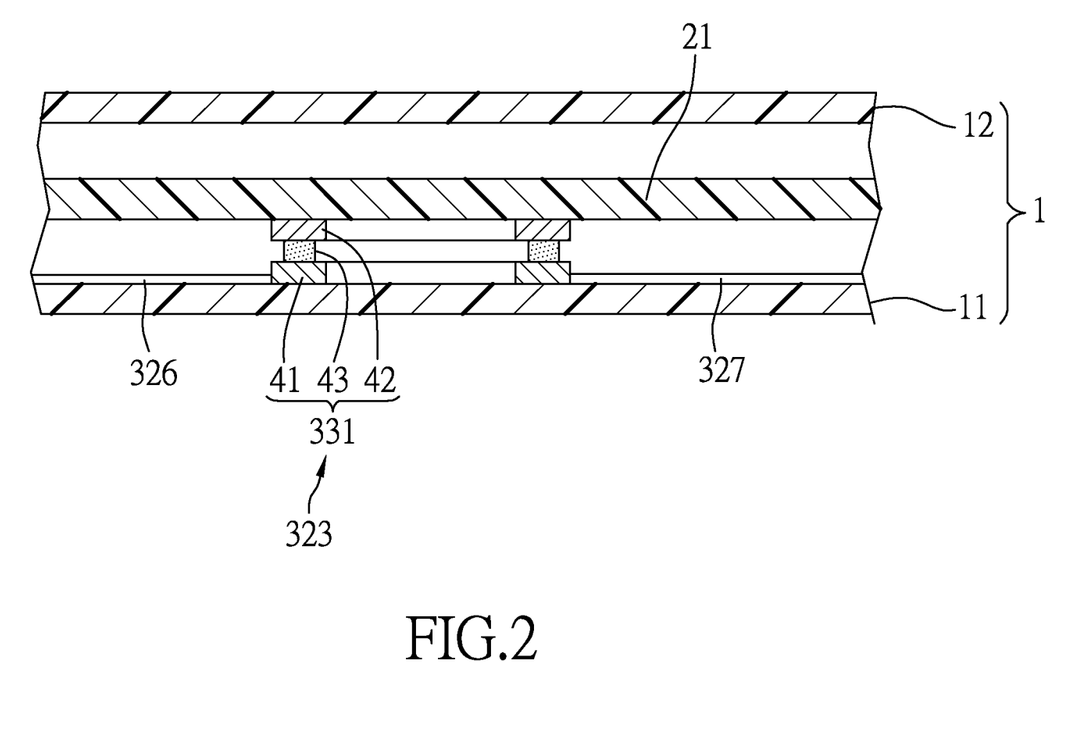
FIG. 2 is a sectional side view of the first embodiment.

Referring to FIGS. 1 and 2, a first embodiment of an anti-tamper system according to the disclosure includes a first object, a number (N) (e.g., three in this embodiment) of second objects and an anti-tamper circuit 3. In this embodiment, the first object is a housing 1, and the second objects are electronic devices 21-23, which are spaced apart from each other, and which may respectively be, for example, a control circuit board of a card reader, a control circuit board of a keyboard, and a control circuit board of a touch screen, but the disclosure is not limited thereto.

In this embodiment, the housing 1 includes a first housing member 11 and a second housing member 12 as shown in FIG. 2.

The electronic devices 21-23 are accommodated in the housing 1. In this embodiment, each electronic device 21-23 is secured to the second housing member 12.

The anti-tamper circuit 3 is accommodated in the housing 1, and includes a number (M) (e.g., three in this embodiment) of conductive networks 32-34 and a control unit 31.

It may be noted that, since each conductive network 32-34 have identical structures in this embodiment, only one conductive network 32 will be described in further detail below for the sake of brevity.

The conductive network 32 includes a first terminal 321, a second terminal 322, a number (N) (three in this embodiment) of conductive modules 323-325 respectively corresponding to (e.g., respectively located on) the electronic devices 21-23, and a number (N+1) (four in this embodiment) of first conductive connect ion members 326-329. For each electronic device 21-23, the corresponding conductive modules 323-325 are arranged thereon in a scattered manner. It is noted that each first conductive connection member 326-329 may be realized in a form of, for example, a wire, or a trace that is formed on the first housing member 11, etc., and the disclosure is not limited thereto.

Each conductive module 323-325 is sandwiched between the first housing member 11 and a corresponding electronic device 21-23 (see FIG. 2 for instance).

The first conductive connection members 326-329 are electrically coupled to the first and second terminals 321, 322 and the conductive modules 323-325 in such a way that the conductive modules 323-325 and the first conductive connection members 326-329 cooperatively form a corresponding electrical path between the first and second terminals 321, 322, where the conductive modules 323-325 are electrically coupled in series, and where the electrical path sequentially goes through the electronic devices 21-23 in the housing 1. In this embodiment, each first conductive connection member 326-329 is electrically coupled between a corresponding one of the first and second terminals 321, 322 and a corresponding conductive module 323-325, or between two corresponding conductive modules 323-325. In one example, the first conductive connection member 326 is electrically coupled between the first terminal 321 and the conductive module 323, the first conductive connection member 327 is electrically coupled between the conductive modules 323, 324, the first conductive connection member 328 is electrically coupled between the conductive modules 324, 325, and the first conductive connection member 329 is electrically coupled between the conductive module 325 and the second terminal 322 as illustrated in FIG. 1.

It is noted that, in this embodiment, the conductive modules 323-325 of each conductive network 32-34 have the same configuration, and therefore only the conductive module 323 of the conductive network 32 is exemplarily described hereinafter for the sake of brevity.

In this embodiment, the conductive module 323 includes a first conductive element 331. As shown in FIG. 2, the first conductive element 331 includes a first pad 41 that is disposed on the first housing member 11 and that is electrically coupled to the corresponding first conductive connection members 326, 327 of the conductive network 32, a second pad 42 that is disposed on the electronic device 21, that is biased to a predetermined voltage, and that corresponds in position to the first pad 41, and a conductive adhesive layer 43 that is sandwiched between the first and second pads 41, 42. In one example, each of the first and second pads 41, 42 is annular, and the conductive adhesive layer 43 may be made from conductive glue or conductive paste.

For each conductive network 32-34, the control unit 31 is electrically coupled to the first and second terminals 321, 322, detects damage of the electrical path, and initiates a predetermined action upon detecting the damage. In this embodiment, the control unit 31 detects the damage of each electrical path based on an auxiliary voltage at the corresponding first or second terminal 321, 322. Moreover, the control unit 31 includes a storage module 311 (e.g., a memory) that stores sensitive data (including, for example, a key, credit card numbers, identification data, personal data, etc.), and the predetermined action includes erasing the sensitive data stored in the storage module 311.

When the anti-tamper system of this embodiment is intact, the electrical paths are maintained, and each auxiliary voltage has a magnitude of a predetermined value.

When the anti-tamper system of this embodiment is partially disassembled at positions proximate to one of the electronic devices 21-23 (e.g., the second housing member 12 is partially moved away relative to the first housing member 11 which is proximate to the one of the electronic devices 21-23), at least one of the electrical paths may be damaged due to cracking of the corresponding conductive module(s) 323-325 (e.g., cracking of the corresponding conductive adhesive layer(s) 35) and/or due to disconnection of the corresponding conductive module (s) 323-325 from at least one of the corresponding first conductive connection members 326-329. As such, the magnitude of the corresponding auxiliary voltage deviates from the predetermined value, so the control unit 31 may erase the sensitive data stored in the storage module 311 to prevent the sensitive data from being retrieved and used for improper purposes accordingly.

Since each electronic device 21-23 corresponds to a number (M) (three in this embodiment) of conductive modules 323-325 that are used to respectively form a number (M) (three in this embodiment) of electrical paths, an attacker must repair all of the original electrical paths or instead establish new electrical paths in a relatively short period of time to prevent the sensitive data from being erased when the original electrical paths are damaged due to the disassembling of the anti-tamper system. Therefore, it is relatively difficult to crack into the anti-tamper system of this embodiment according to the present disclosure.

It is noted that, in other embodiments, the following modifications may be made to this embodiment:

1. Each of N and M may be a plural number other than three.

2. For the conductive module 323 of the conductive network 32, the first pad 41 may be disposed on the electronic device 21 instead of the first housing member 11, and the second pad 42 may be disposed on the first housing member 11 instead of the electronic device 21. In other words, the first conductive connection members 326, 327 of the conductive network 32 are electrically coupled to the pad which is disposed on the electronic device 21 (i.e., the first pad 41).

3. The first object may be an electronic device instead of the housing 1.

Figure 3:
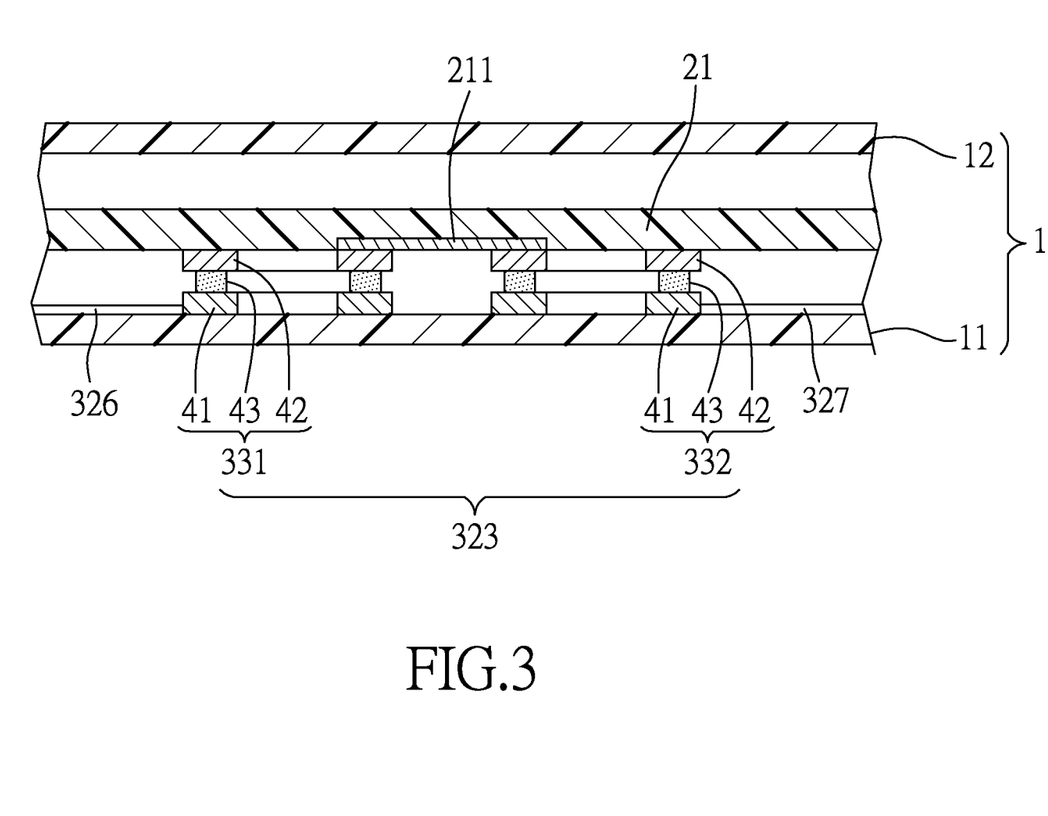
FIG. 3 is a sectional side view of a second embodiment of the anti-tamper system according to the disclosure.

Referring to FIGS. 1 and 3, a second embodiment of the anti-tamper system according to the disclosure is a modification of the first embodiment, and differs from the first embodiment in the configuration of the electronic devices 21-23 and the conductive modules 323-325.

In the second embodiment, each electronic device 21-23 is provided with a number (M) (three in this embodiment) of second conductive connection members 211. It is noted that each second conductive connection member 211 may be realized in a form of, for example, a wire, or a trace that is formed on the corresponding electronic device 21-23, etc., and the disclosure is not limited thereto.

It may be noted that, in this embodiment, the conductive modules 323-325 of the conductive networks 32-34 have the same configuration, and therefore only the conductive module 323 of the conductive network 32 is exemplarily described hereinafter for the sake of brevity.

As shown in FIG. 3, the conductive module 323 further includes a second conductive element 332. The first conductive element 331 electrically interconnects the first conductive connection member 326 of the conductive network 32 and a corresponding second conductive connection member 211 of the electronic device 21. The second conductive element 332 electrically interconnects the first conductive connection member 327 of the conductive network 32 and the corresponding second conductive connection member 211 of the electronic device 21. Therefore, the second conductive element 332 is electrically coupled to the first conductive element 331 via the corresponding second conductive connection member 211 of the electronic device 21. Each of the first and second conductive elements 331, 332 includes a first pad 41 that is disposed on the first housing member 11 and that is electrically coupled to the corresponding first conductive connection member 326, 327 of the conductive network 32, a second pad 42 that is disposed on the electronic device 21, that is biased to a predetermined voltage, that corresponds in position to the first pad 41, and that is electrically coupled to the corresponding second conductive connection member 211 of the electronic device 21, and a conductive adhesive layer 43 that is sandwiched between the first and second pads 41, 42.

It is noted that, in this embodiment, the conductive modules 323-325 and the first conductive connection members 326-329 of each conductive network 32-34 cooperate with the electronic devices 21-23 to form the corresponding electrical path.

When the anti-tamper system of this embodiment is partially disassembled at positions proximate to one of the electronic devices 21-23 (e.g., the second housing member 12 is partially moved away relative to the first housing member 11 which is proximate to the one of the electronic devices 21-23), at least one of the electrical paths may be damaged due to cracking of the corresponding conductive module(s) 323-325 (e.g., cracking of the corresponding conductive adhesive layer(s) 43) and/or due to disconnection of the corresponding conductive module (s) 323-325 from at least one of the corresponding conductive connection members 211, 326-329.

By virtue of the abovementioned configuration, the second embodiment may achieve the same effect as the first embodiment according to the present disclosure.

It should be noted that, in a modification of the second embodiment, for each conductive network 32-34, each of the second pads 42 of the conductive modules 323-325 may be not biased to the predetermined voltage, and the control unit 31 may output a respective detection signal to the first terminal 321, may receive the respective detection signal from the second terminal 322, and may initiate the predetermined action when not receiving the respective detection signal. In this modification, the detection signals may be different from one another.

When the anti-tamper system of this modification is intact, the electrical paths are maintained, and each detection signal outputted by the control unit 31 is transmitted from the corresponding first terminal 321 to the corresponding second terminal 322 via the electrical path formed therebetween, and is thus received by the control unit 31.

When the anti-tamper system of this modification is partially disassembled at positions proximate to one of the electronic devices 21-23 (e.g., the second housing member 12 is partially moved away relative to the first housing member 11 which is proximate to the one of the electronic devices 21-23), at least one of the electrical paths may be damaged. As such, the corresponding detection signal (S1-S3) is unable to be transmitted from the corresponding first terminal 321 to the corresponding second terminal 322 and thus cannot be received by the control unit 31, so the control unit 31 may erase the sensitive data stored in the storage module 311.

Figure 4:
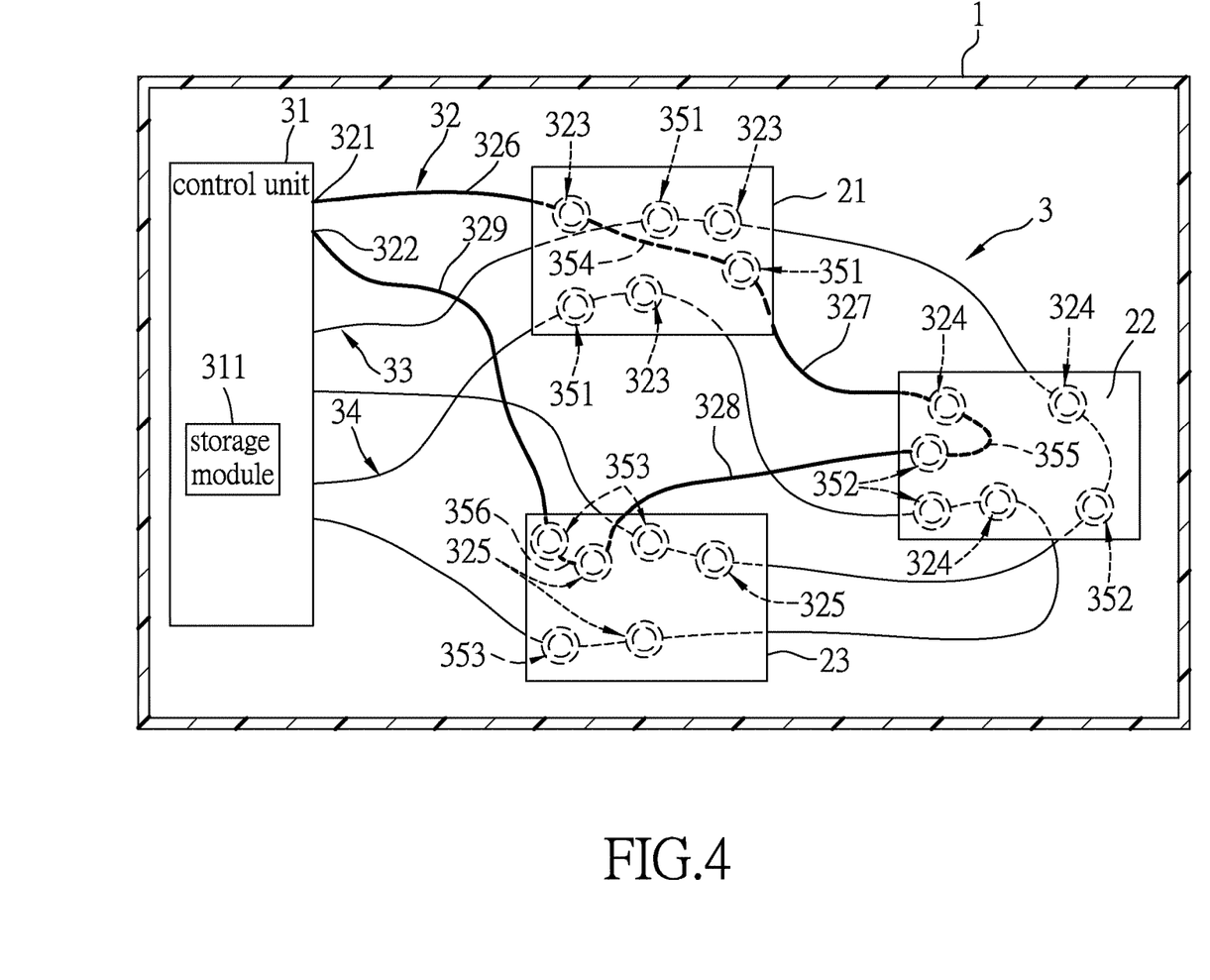
FIG. 4 is a schematic diagram illustrating a third embodiment of the anti-tamper system according to the disclosure.

Referring to FIG. 4, a third embodiment of the anti-tamper system according to the disclosure is a modification of the first embodiment, and differs from the first embodiment in the configuration of the conductive networks 32-34.

In the third embodiment, since the conductive networks 32-34 have identical structures in this embodiment, only one conductive network 32 will be described in further detail below for the sake of brevity.

The conductive network 32 includes more conductive modules and more first conductive connection members compared with that of the first embodiment. Each electronic device 21-23 corresponds to at least one of the conductive modules of the conductive network 32.

In one example, the conductive network 32 further includes a number (N) (three in this embodiment) of conductive modules 351-353 respectively corresponding to (e.g., respectively located on) the electronic devices 21-23, and a number (N) (three in this embodiment) of first conductive connection members 354-356. In other words, each electronic device 21-23 corresponds to two conductive modules 323-325, 351-353. The first conductive connection member 326 is electrically coupled between the first terminal 321 and the conductive module 323, the first conductive connection member 354 is electrically coupled between the conductive modules 323, 351, the first conductive connection member 327 is electrically coupled between the conductive modules 351, 324, the first conductive connection member 355 is electrically coupled between the conductive modules 324, 352, the first conductive connection member 328 is electrically coupled between the conductive modules 352, 325, the first conductive connection member 356 is electrically coupled between the conductive modules 325, 353, and the first conductive connection member 329 is electrically coupled between the conductive module 353 and the second terminal 322.

By virtue of the abovementioned configuration, the third embodiment may achieve the same effect as the first embodiment according to the present disclosure.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that the disclosure is not limited to the disclosed embodiment but is intended to cover various arrangements included within the spirit and scope of the broadest interpretation so as to encompass all such modifications and equivalent arrangements.

What is claimed is:
1. An anti-tamper system comprising:
a first object;
a plurality of second objects;

an anti-tamper circuit including a plurality of conductive networks and a control unit;
wherein each of said conductive networks includes:
a first terminal electrically connecting to said control unit,
a second terminal electrically connecting to said control unit,
a plurality of conductive modules, wherein each of said conductive modules corresponding to one of said second objects, and each of said conductive modules are sandwiched between said first object and a corresponding one of said second objects, and
a plurality of first conductive connection members electrically coupled to said first and second terminals and said conductive modules in such a way that at least said conductive modules and said first conductive connection members cooperatively form a corresponding electrical path between said first and second terminals, said conductive modules being electrically coupled in series, said electrical path sequentially going through said second objects;
wherein, for each of said conductive networks, said control unit is electrically coupled to said first and second terminals, detects damage of said electrical path, and initiates a predetermined action upon detecting the damage;
wherein for each of said conductive networks, each of said conductive modules includes:
a first pad disposed on said first object, and electrically coupled to two corresponding ones of said first conductive connection members,
a second pad disposed on one of said second objects to which said conductive module corresponds, and
a conductive adhesive layer sandwiched between said first and second pads; and
wherein said control unit further stores sensitive data, and the predetermined action includes erasing the sensitive data.

2. The anti-tamper system of claim 1, wherein for each of said conductive networks, each of said conductive modules is electrically coupled to said corresponding one of said second objects, and said conductive modules and said first conductive connection members cooperate with said second objects to form said corresponding electrical path.

3. The anti-tamper system of claim 2, wherein for each of said conductive networks, each of said conductive modules includes:
a first conductive element electrically coupled between a corresponding one of said first conductive connection members and one of said second objects to which said conductive module corresponds; and
a second conductive element electrically coupled between a corresponding one of said first conductive connection members and said one of said second objects, and electrically coupled to said first conductive element via said one of said second objects.

4. The anti-tamper system of claim 3, wherein:
each of said second objects is provided with a plurality of second conductive connection members; and
said first and second conductive elements of each of said conductive modules are electrically coupled to a corresponding one of said second conductive connection members of one of said second objects to which said conductive module corresponds.

5. The anti-tamper system of claim 3, wherein each of said first and second conductive elements includes:

a first pad disposed on said first object, and electrically coupled to said corresponding one of said first conductive connection members;
a second pad disposed on and electrically coupled to said one of said second objects; and
a conductive adhesive layer sandwiched between said first and second pads.

6. The anti-tamper system of claim 1, wherein for each of said conductive networks, each of said first conductive connection members is electrically coupled between a corresponding one of said first and second terminals and a corresponding one of said conductive modules, or between two corresponding ones of said conductive modules.

7. The anti-tamper system of claim 1, wherein said second objects are spaced apart from each other.

8. An anti-tamper circuit operatively associated with a first object and a plurality of second objects, said anti-tamper circuit comprising:
a plurality of conductive networks and a control unit;
wherein each of said conductive networks includes:
a first terminal electrically connecting to said control unit,
a second terminal electrically connecting to said control unit,
a plurality of conductive modules, each of said conductive modules corresponding to one of the second objects, and each of said conductive modules used to be sandwiched between the first object and a corresponding one of the second objects, and
a plurality of first conductive connection members electrically coupled to said first and second terminals and said conductive modules in such a way that at least said conductive modules and said first conductive connection members cooperatively form a corresponding electrical path between said first and second terminals, said conductive modules being electrically coupled in series, said electrical path sequentially going through the second objects;
wherein, for each of said conductive networks, said control unit is electrically coupled to said first and second terminals, detects damage of said electrical path, and initiates a predetermined action upon detecting the damage;
wherein for each of said conductive networks, each of said conductive modules includes:
a first pad electrically coupled to two corresponding ones of said first conductive connection members, and used to be disposed on the first object,
a second pad used to be disposed on one of the second objects to which said conductive module corresponds, and
a conductive adhesive layer sandwiched between said first and second pads; and
wherein said control unit further stores sensitive data, and the predetermined action includes erasing the sensitive data.

9. The anti-tamper circuit of claim 8, wherein for each of said conductive networks, each of said conductive modules is used to be electrically coupled to the corresponding one of the second objects, and said conductive modules and said first conductive connection members are used to cooperate with the second objects to form said corresponding electrical path.

10. The anti-tamper circuit of claim 9, wherein for each of said conductive networks, each of said conductive modules includes:
a first conductive element electrically coupled to a corresponding one of said first conductive connection members, and used to be electrically coupled to one of the second objects to which said conductive module corresponds; and a second conductive element electrically coupled to a corresponding one of said first conductive connection members, and used to be electrically coupled to the one of the second objects, said second conductive element being electrically coupled to said first conductive element via the one of the second objects.

11. The anti-tamper circuit of claim 10, each of the second objects being provided with a plurality of second conductive connection members, wherein said first and second conductive elements of each of said conductive modules are used to be electrically coupled to a corresponding one of the second conductive connection members of one of the second objects to which said conductive module corresponds.

12. The anti-tamper circuit of claim 10, wherein each of said first and second conductive elements includes:

a first pad electrically coupled to said corresponding one of said first conductive connection members, and used to be disposed on the first object;

a second pad used to be disposed on and electrically coupled to the one of the second objects; and a conductive adhesive layer sandwiched between said first and second pads.

13. The anti-tamper circuit of claim 8, wherein for each of said conductive networks, each of said first conductive connection members is electrically coupled between a corresponding one of said first and second terminals and a corresponding one of said conductive modules, or between two corresponding ones of said conductive modules.

* * * * *